United States Patent
Bash et al.

(10) Patent No.: US 11,572,259 B2
(45) Date of Patent: Feb. 7, 2023

(54) SYSTEM AND METHOD FOR AERIAL CORD RELEASE MECHANISMS

(71) Applicant: Flytrex Aviation Ltd., Tel Aviv (IL)

(72) Inventors: Yariv Bash, Tel Aviv (IL); Amit Regev, Tel Aviv (IL); Vadim Zlotnik, Beer Sheva (IL); Alexander Maryanovsky, Rishon Lezion (IL); Roman Dvorkin, Givatayim (IL)

(73) Assignee: Flytrex Aviation Ltd., Tel Aviv (IL)

( * ) Notice: Subject to any disclaimer, the term of this patent is extended or adjusted under 35 U.S.C. 154(b) by 400 days.

(21) Appl. No.: 16/897,961

(22) Filed: Jun. 10, 2020

(65) Prior Publication Data
US 2020/0299115 A1    Sep. 24, 2020

Related U.S. Application Data

(63) Continuation-in-part of application No. 16/568,966, filed on Sep. 12, 2019, now Pat. No. 10,919,734.

(60) Provisional application No. 62/859,368, filed on Jun. 10, 2019, provisional application No. 62/755,779, filed on Nov. 5, 2018.

(51) Int. Cl.
| | |
|---|---|
| *B66D 1/48* | (2006.01) |
| *B66D 1/58* | (2006.01) |
| *B64D 1/12* | (2006.01) |
| *B66D 1/34* | (2006.01) |
| *B64D 1/22* | (2006.01) |
| *B66D 1/24* | (2006.01) |

(52) U.S. Cl.
CPC ............... *B66D 1/48* (2013.01); *B64D 1/12* (2013.01); *B64D 1/22* (2013.01); *B66D 1/24* (2013.01); *B66D 1/34* (2013.01); *B66D 1/58* (2013.01)

(58) Field of Classification Search
CPC ... B66D 1/48; B66D 1/24; B66D 1/34; B66D 1/58; B66D 1/60; B64D 1/12; B64D 1/22; B64C 2201/027; B64C 2201/108; B64C 2201/128; B64C 39/024
See application file for complete search history.

(56) References Cited

U.S. PATENT DOCUMENTS 3,389,880 A * 6/1968 Ferguson ................. B64D 1/22
244/152
4,944,480 A 7/1990 Jarrett
(Continued)

FOREIGN PATENT DOCUMENTS

| CA | 2762546 A1 | 6/2013 |
| CN | 203095407 U | 7/2013 |

(Continued)

OTHER PUBLICATIONS

"How to Build an Awesome Trebuchet", Nov. 17, 2012, http://wildernessarena.com/supplies/weapons/how-to-build-a-trebuchet-catapult-offense-defense.

*Primary Examiner* — Stephen A Vu
(74) *Attorney, Agent, or Firm* — M&B IP Analysts, LLC

(57) ABSTRACT

A method for passive aerial cord release mechanisms and an aerial cord release mechanism for an aerial vehicle (AV). A method includes determining a retracting force to be applied to a winch of an aerial vehicle (AV), wherein the determined retracting force is a force required to retract a cord to be coiled around the winch within the AV, and the cord is temporarily coupled to the winch, such that an external force exceeding a predetermined threshold causes decoupling between the cord and the winch.

17 Claims, 3 Drawing Sheets

(56) References Cited

U.S. PATENT DOCUMENTS

| | | | |
|---|---|---|---|
| 6,530,548 B2 | 3/2003 | Pizzirusso | |
| 7,617,629 B2 | 11/2009 | Lizardo | |
| 8,231,083 B2 * | 7/2012 | Kutzmann | B65H 75/44 |
| | | | 244/137.4 |
| 8,468,738 B1 | 6/2013 | Long | |
| 9,174,733 B1 * | 11/2015 | Burgess | B64C 39/024 |
| 9,321,531 B1 * | 4/2016 | Takayama | B64C 39/02 |
| 2015/0158587 A1 * | 6/2015 | Patrick | B64D 1/22 |
| | | | 701/3 |
| 2016/0330944 A1 | 11/2016 | Miller | |
| 2017/0086435 A1 | 3/2017 | Locker | |
| 2017/0259941 A1 | 9/2017 | Briggs, IV et al. | |

FOREIGN PATENT DOCUMENTS

| | | | |
|---|---|---|---|
| CN | 207072759 U | 3/2018 | |
| EP | 3494043 A1 * | 6/2019 | B64C 39/024 |
| WO | 2012027771 A1 | 3/2012 | |

* cited by examiner

SYSTEM AND METHOD FOR AERIAL CORD RELEASE MECHANISMS

CROSS-REFERENCE TO RELATED APPLICATIONS

This application claims the benefit of U.S. Provisional Application No. 62/859,368 filed on Jun. 10, 2019, and is a continuation-in-part (CIP) of U.S. patent application Ser. No. 16/568,966 filed on Sep. 12, 2019, currently pending, which claims the benefit of U.S. Provisional Application No. 62/755,779 filed on Nov. 5, 2018. All of the applications referenced above are herein incorporated by reference.

TECHNICAL FIELD

The present disclosure relates generally to aerial parcel delivery, and, more specifically, to cord release mechanisms for aerial parcel delivery.

BACKGROUND

As aerial parcel delivery becomes more popular, so do solutions for securing various aspects of aerial parcel delivery. For example, unmanned aerial vehicles, such as drones, have become more popular for delivering parcels to customers, and techniques for protecting drones and the parcels that they deliver are needed.

One such technique for securing drones and the parcels they deliver, e.g., from theft or damage, is to limit the landing of a drone to an area in close proximity to an intended recipient so that only an authorized person can remove the parcel from the drone. However, this technique requires landing a drone, which may be a somewhat large, close to civilians who may not strictly adhere to safety precautions and regulations, thereby risking injury along with increased liability concerns.

Another technique for securing drones or parcels includes lowering parcels from a drone via a cable using a mechanism such as a drone-mounted winch. However, this technique also presents challenges due to the complexity of such cable mechanisms, as it will often require the capacity to detach the cable from the parcel automatically without human intervention. The mechanisms used for existing solutions are expensive and prone to failure. In particular, the greater the number of moving parts included in such a mechanism, the higher the likelihood that the mechanism will malfunction due to the failure of one or more of its components.

An additional concern during package delivery is that an unexpected force exerted on a cord used for parcel delivery, before the cord's retraction, may cause damage to the drone itself. Something or someone, e.g., a child or an animal, could grasp onto the low-hanging cord and become entangled as it is being retracted into the air, which would not only be dangerous, but could additionally cause damage to the drone. Further, there is potential for vandalism or theft of the drone itself, whereby someone may purposefully pull on the cord in an attempt to pull the drone to the ground. Employing sensors to detect an applied force and determine the best response is costly and difficult to efficiently implement.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for passive aerial cord release mechanisms. The method comprises: determining a retracting force to be applied to a winch of an aerial vehicle (AV), wherein the determined retracting force is a force required to retract a cord to be coiled around the winch within the AV, and wherein the cord is temporarily coupled to the winch, such that an external force exceeding a predetermined threshold causes decoupling between the cord and the winch.

Certain embodiments disclosed herein also include an aerial cord release mechanism for an aerial vehicle (AV). The aerial cord release mechanism for an aerial vehicle (AV) comprises: a processing circuity; a cord coiled around a winch; a motor connected to the winch; and a memory, the memory containing instructions that, when executed by the processing circuitry, configure the aerial cord release mechanism to: determine a retracting force to be applied to a winch of an aerial vehicle (AV), wherein the determined retracting force is a force required to retract a cord to be coiled around the winch within the AV, and wherein the cord is temporarily coupled to the winch, such that an external force exceeding a predetermined threshold causes decoupling between the cord and the winch.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
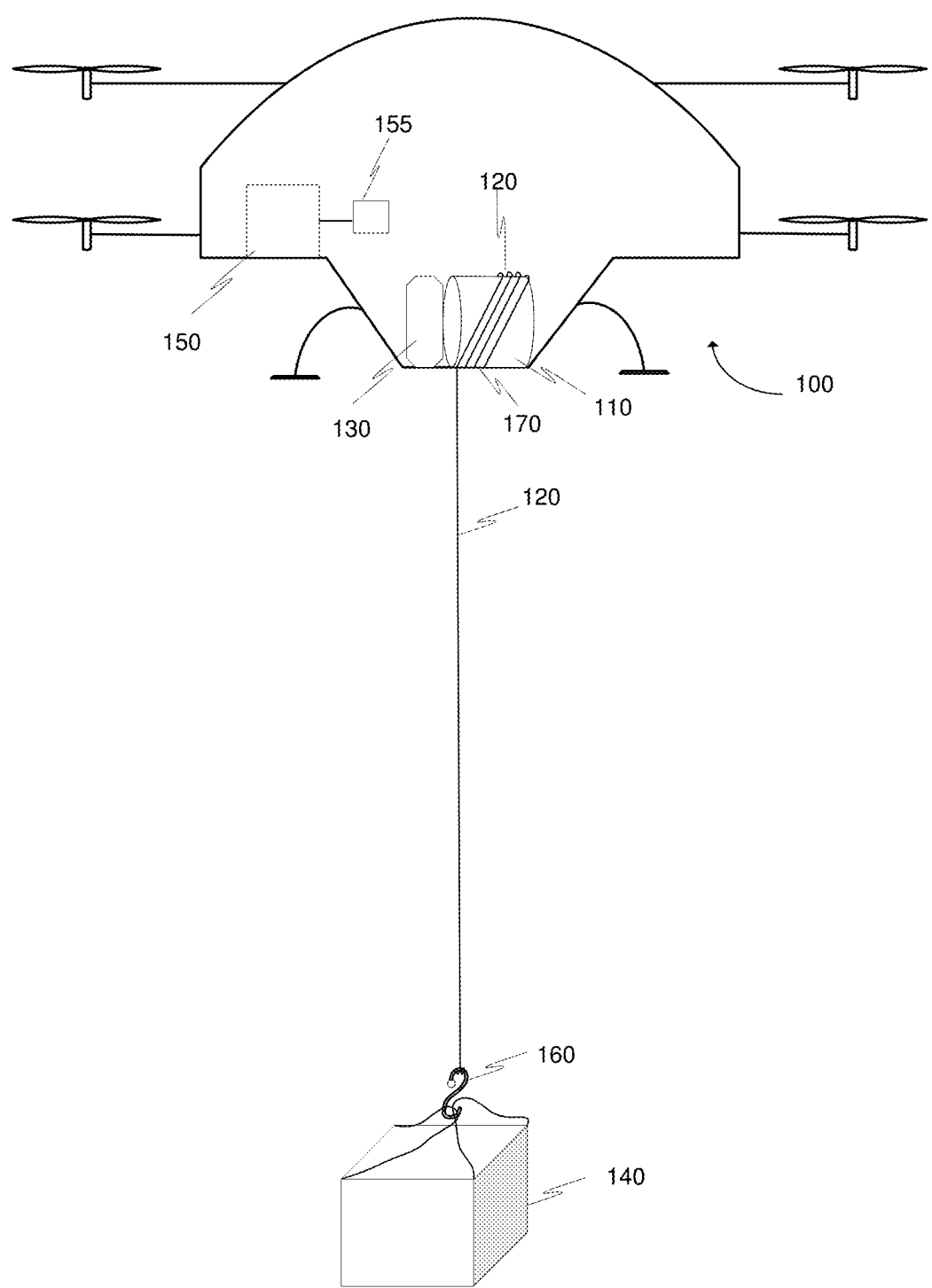
FIG. 1 is a schematic illustration of an aerial vehicle, such as an unmanned aerial vehicle (UAV), according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic illustration of an aerial vehicle, such as an unmanned aerial vehicle (UAV) 100, according to an embodiment. The UAV 100, also referred to as the drone 100, includes a processing circuitry 150, a memory 155, a hatch door 170, and a motor 130 that is connected to a winch 110. The winch 110 has a cord 120 coiled around its body and is placed in proximity to the hatch door 170 such that the cord 120 may extend outside of the UAV 100. In an embodiment, the cord 120 is affixed to a coupling mechanism such as a hook 160 as further described in U.S. patent application Ser. No. 16/568,966, assigned to common assignee, the contents of which are incorporated by reference herein.

The hook 160 is configured to be connected to a package 140 for delivery. The processing circuitry 150 receives a set of control instructions from an external server (not shown), e.g., via a wireless cellular connection. In another embodiment, the UAV 100 communicates with the server via an intermediary device, such as a controlling device. The set of control instructions may include, but is not limited to, a navigation plan to a delivery location, parcel information, hover height, package weight, cord weight, cord length, hook weight and current or anticipated weather conditions.

In another embodiment, the memory 155 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions configure the processing circuitry 150 to perform the various processes described herein including, without limitation, the method of FIG. 3, below.

The control instructions configure the drone to fly and hover at a specified height. In an embodiment, the UAV 100 includes an altimeter (not shown), which the processing circuitry 150 can use to determine, in real-time, if the drone is flying or hovering at the specified height, and if it is not, the UAV 100 is instructed to correct its course accordingly. The weight of the package 140 determines the amount of force required on the winch 110 to hold or lower the package 140, where the force required to lower the package is referred to as the slow-release force, and the height of the UAV 100 determines the amount of time the motor 130 applies the force to ensure that the package 140 lands on the ground in a safe manner. In another embodiment, the ground level is detected by way of a tension sensor (not shown) coupled with the cord, or via a feedback circuitry within the motor 130.

The control instructions further include an instruction to open the hatch door 170, for example, in response to receiving a direct request to descend the payload, or in response to arriving at a specified delivery location. In an embodiment, the UAV 100 further includes a positioning device, such as a GPS receiver, which is configured to determine the location of the UAV 100 in real time. In an embodiment, the cord 120 is longer than the anticipated hover height of the UAV 100 during delivery so that the delivery package 140 can safely reach the ground at the delivery location. Once the package 140 touches the ground, the hook 160 is configured to release the package 140, and the processing circuitry 150 configures the motor 130 to exert a retracting force to raise the hook 160 and the cord 120 based on the combined weight of both, causing the hook 160 and cord 120 to retract back toward the UAV 100. The force for both the release of and the retraction of the cord is always lower than the potential maximum UAV lift force, after subtracting the UAV's own weight. Thus, any attempt to pull on the cord will result in release of the cord only, keeping the drone safe. In certain embodiments the amount of force required to retract includes a delta, so that the amount of force is large enough to retract the hook 160 and cord 120, but not large enough to retract the package, or an additional weight larger than the delta force.

Figure 2:
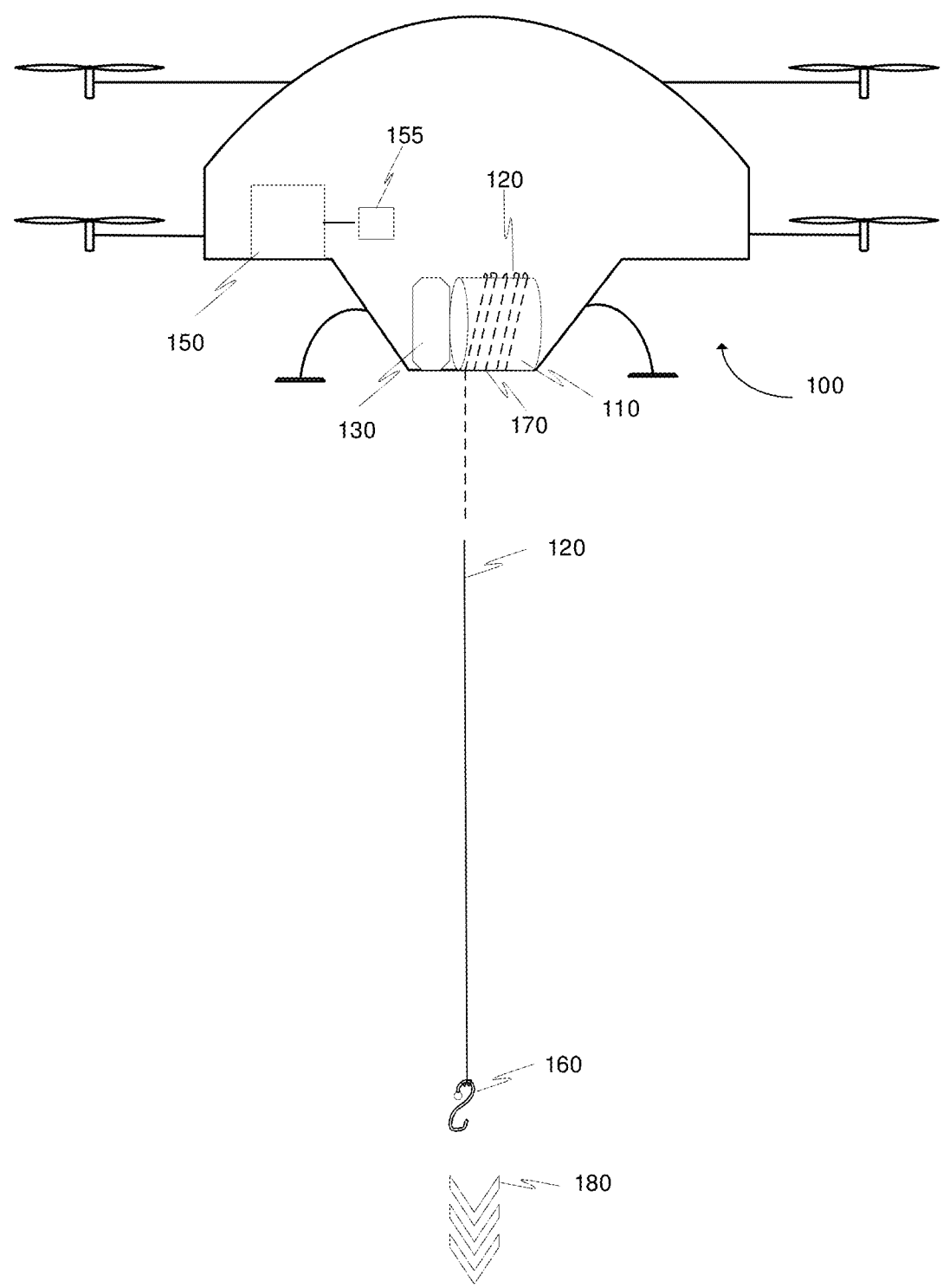
FIG. 2 is a schematic illustration of an unmanned aerial vehicle (UAV) equipped with a cord-releasing mechanism, according to an embodiment.

FIG. 2 is a schematic illustration of an unmanned aerial vehicle (UAV) 100 equipped with a cord-releasing mechanism, according to an embodiment. As discussed in FIG. 1, the UAV 100 includes a processing circuitry 150, such as a central processing unit, a memory, a hatch door 170, and a motor 130 that is connected to a winch 110. The processing circuitry 150 is configured to determine the amount of retracting force required to wind the cord 120 back around the winch 110 in the UAV 100, thereby retracting the cord 120 and the hook.

In an embodiment, the retracting force is determined based on the combined weight of the cord 120 and the hook 160, and is lower than a lift force generated by the UAV 100. The retracting force may be greater than or equal to the combined weight of the cord and the hook, thereby preventing the cord from unspooling and falling to the ground. The degree to which the retracting force exceeds the combined weight of the cord and the hook may be predetermined or otherwise configured based on the desired rate of cord retraction. The retracting force may be determined according to the equation:

$$F_T \geq (M_{cord} + M_{hook}) * g$$

In the above equation, the retracting force, $F_T$, is greater than or equal to the product of the gravitational acceleration, g, often approximated as 9.8 meters per second squared or 32 feet per second squared, multiplied by the sum of the mass of the hook and the mass of the cord. To retract the cord, a force greater than the combined weights of the hook and the cord is required. To hold the cord at a constant length, a force equal to the combined weight of the cord and the hook is required. The mass of the cord may be determined according to the equation:

$$M_{cord} = L * A * \rho$$

In the above equation, the mass of the cord, $M_{cord}$, is equal to the product of the length of the cord, L, multiplied by the cross-sectional area of the cord, A, multiplied by the density of the cord, $\rho$, given in units of mass per unit volume. Where the linear mass density, $\lambda$, expressed in units of mass per unit length, is known or predetermined, the mass of the cord may be given as:

$$M_{cord} = L * \lambda$$

Further, the retracting force may be adjusted during the retracting process to account for the reduction in mass arising from the reduction of length of the extended cord as the cord is retracted. The retracting force may be given as a function of the non-retracted cord length, $L_{extended}$, according to the equations below, to provide a force sufficient to retract the cord at all stages of extension.

$$F_T \geq ((L_{extended} * A * \rho) + M_{hook})) * g$$

The equation above, relating the retracting force to the remaining extended cord, may be alternately expressed as:

$$F_T \geq ((L_{extended} * \lambda) + M_{hook})) * g$$

In the equation above, the retracting force, $F_T$, is given as a function of the length of the cord extended at a given instant, $L_{extended}$, allowing for adjustment of the retracting force based on the weight of the cord which is unspooled. The linear mass density, $\lambda$, describes the mass of the cord per unit length, and is expressed using units reflecting the same.

Additionally, the processing circuitry 150 may be configured to send a signal to the motor 130 to exert the required, pre-determined force on the winch 110.

If an external force 180 greater than a predetermined threshold is exerted on the end of the cord 120 opposite the winch 110, or on the hook 160, the UAV 100 is configured to allow the winch 110 to spin freely and release the cord 120, lowering the cord 120 to the ground without affecting the UAV 100. In an embodiment, the predetermined threshold is a force greater than the retracting force generated by the motor. In an embodiment, the cord 120 is not permanently coupled to the winch, such that if the winch 110 is allowed to spin beyond a certain number of revolutions, the cord 120 will automatically be released from the winch 110, and thus not affect the UAV 100. The external force 180 may be one exerted on the cord 120 by a person or animal or caused by a malfunction of the hook-release system for a package being delivered.

Figure 3:
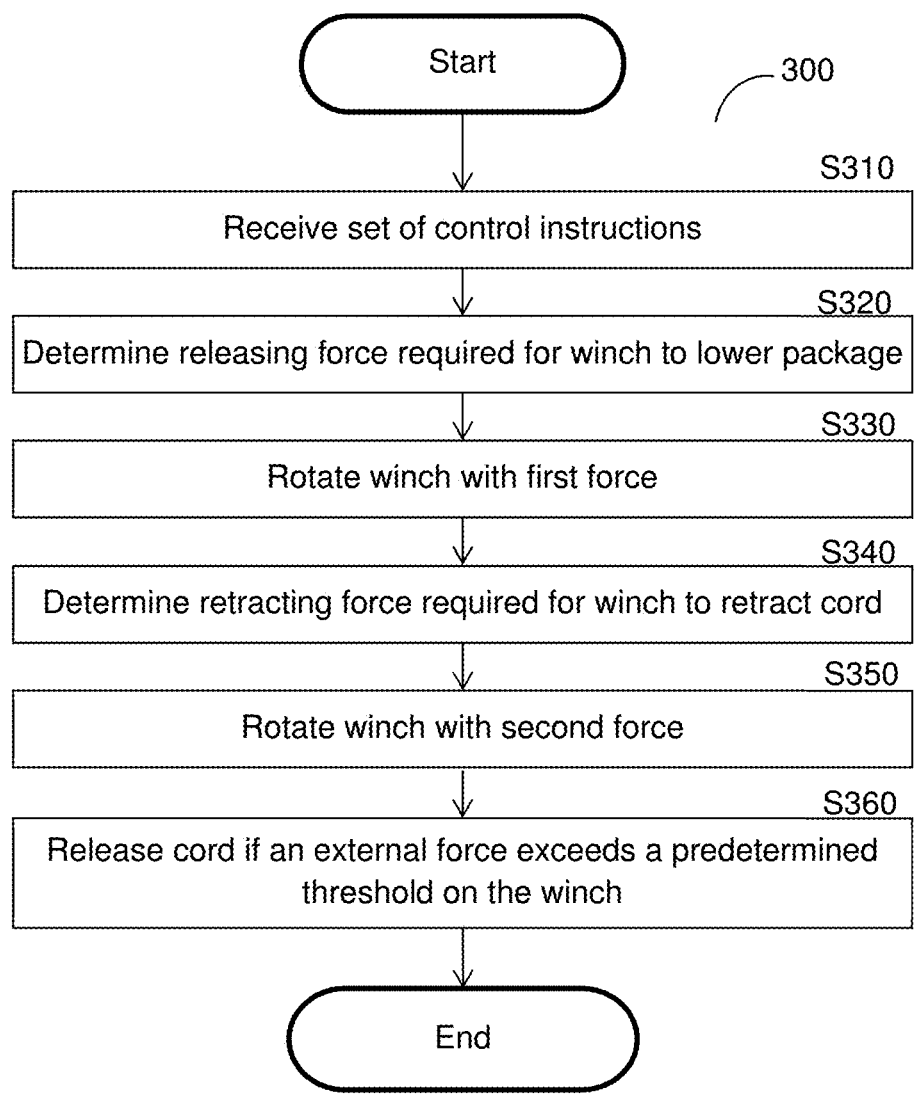
FIG. 3 is a flowchart illustrating a method for cord extension and retraction for aerial parcel delivery, according to an embodiment.

FIG. 3 is an example flowchart 300 illustrating a method for cord extension and retraction for aerial parcel delivery, according to an embodiment.

At S310, a set of control instructions is received, e.g., by an aerial vehicle, such as a UAV, from a server via wireless connection. The control instructions may include delivery data, such as a navigation plan for the UAV, a delivery location, hover height during flight and delivery, cord weight, cord length, hook weight, package weight, and current or anticipated weather conditions.

At S320, a UAV winch slow-release force, applicable to counteract some or all of the force of gravity acting on the combined cord, hook, and package, is determined. In an embodiment, the slow-release force is the degree of retracting force required to control the descent of the cord, hook, and package, and to safely lower a delivery package to the ground at a specified location based on delivery data. The slow-release force may be less than the combined weight of the package, hook, and cord, and may be expressed according to the equation below.

$$F_S < (M_{cord} + M_{hook} + M_{package}) * g$$

In the above equation, the slow-release force, $F_S$, acts in the same direction as the retracting force might act during cord retraction, and in the direction opposite to the direction of the gravitational force. The slow-release force, $F_S$, is given as a force less than the gravitational force determined as the product of the gravitational acceleration, g, multiplied by the sum of the masses of the package, the hook, and the cord, where the mass of the cord, $M_{cord}$, may be determined with respect to the equations describing FIG. 2, above. Further, as above, the slow-release force may be adjusted during release to account for the weight of the extended cord, as described in the equation below.

$$F_S < ((L_{extended} * \lambda) + M_{hook} + M_{package}) * g$$

The above equation describes the slow-release force, $F_S$, as a function of the length of cord which is unspooled at a given instant, $L_{extended}$, allowing for adjustment of the slow-release force based on the weight of the cord which is unspooled. As above, the linear mass density, $\lambda$, describes the mass of the cord per unit length, and is expressed in units reflecting the same.

The delivery data includes the hover height of the UAV, the delivery package weight, the delivery package size, current weather conditions, and the like. The delivery package is attached to the UAV via a cord, where the cord is wrapped around the winch without being securely fastened thereto. For example, the cord is held in place by the friction of the wound cord onto itself or onto the winch, creating a temporary coupling between the cord and winch.

As such, if no opposing retracting force, including the slow-release force described above, is applied to the winch, the gravitational force, equal to the combined weights of the hook, cord, and any attached package, as well as any external forces, such as animals pulling on the cord, will pull the cord, hook, and package toward the ground. Where no opposing retracting force is applied, the winch can disengage from the motor, allowing the cord to fully unravel and automatically disengage from the winch. In an embodiment, the releasing force is lower than the potential maximum UAV lift force minus the UAV's own total weight.

At S330, a motor connected to the winch is configured to provide the determined slow-release force to the winch. This may cause the winch to rotate at a desired or predetermined speed and torque, to release the required length of cord from the UAV, and to lower the package to the ground or another delivery surface. In an embodiment, the slow-release force is determined based on a predetermined amount of time required for a length of cord to be released, where the predetermined length of cord is sufficient to ensure the package touches the delivery surface. For example, it may be determined that the UAV is hovering at a height of 20 meters above the delivery surface, and the releasing force is applied for forty seconds, after which the package is expected to land safely on the delivery surface. A self-release hook may then release from the package.

At S340, the motor is configured to provide the winch with a retracting force to retract the cord and the hook. The retracting force is lower than the potential maximum UAV lift force less the UAV's own weight. In an embodiment, the retracting force is based on data such as, but not limited to, the combined weight of the cord and the hook and the hover height of the UAV.

At S350, a motor connected to the winch is configured to provide the determined retracting force to the winch. This may cause the winch to rotate at a desired or predetermined speed and torque, retracting the cord into the UAV. In an embodiment, the retracting force is smaller than the slow-release force, and each of the releasing and retracting forces are smaller than the potential maximum UAV lift force minus the UAV's own total weight.

At S360, the cord is released from the winch if an external force exceeding a predetermined threshold on the winch is detected. In an embodiment, when the external force detected as being exerted on the hook or the cord of the UAV is greater than the force exerted by the motor connected to the winch, during the application of either the slow-release or retracting forces, the winch releases the cord in direction of the exerted force, i.e., toward the ground, and releases the total length of the cord, freeing it from the UAV. In an embodiment, the motor connected to the winch is configured to disengage fully from the winch, allowing the winch to freely spin and release the cord. By configuring the release mechanism in this manner, the UAV cannot be pulled down by the cord or stuck if the cord is inadvertently snagged on an object, such as a tree branch. As no sensors are required to determine if a force is exerted, this solution provides an economical and efficient method when compared to relying directly on sensors.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("processing circuits"), a memory, and input/output interfaces. The computer platform may also include an operating system and microinstruction code. The various processes and functions described herein may be either part of the microinstruction code or part of the application program, or any combination thereof, which may be executed by a processing circuitry, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for operating a passive aerial cord release mechanism, comprising:
    determining a retracting force to be applied to a winch of an aerial vehicle (AV), wherein the determined retracting force is a force required to retract a cord to be coiled around the winch within the AV, and wherein the cord is temporarily coupled to the winch, such that an external force exceeding a predetermined threshold causes decoupling between the cord and the winch; and
    determining a slow-release force to be applied to the winch of the AV, wherein the determined slow-release force is a force required to lower a package from the AV by the cord coiled around the winch; and wherein the slow-release force is determined based on a predetermined speed and torque of the winch.

2. The method of claim 1, wherein the predetermined threshold is a force greater than the retracting force.

3. The method of claim 1, wherein the predetermined threshold is a force greater than the slow-release force.

4. The method of claim 1, wherein the slow-release force is determined based on a predetermined amount of time required for a length of cord to be released that is sufficient to ensure the package touches a delivery surface.

5. The method of claim 1, wherein the slow-release force is based on delivery data.

6. The method of claim 5, wherein the delivery data includes at least one of: a navigation plan for the AV, a delivery location, a hover height during AV flight and package delivery, a cord weight, a cord length, a hook weight, a package weight, and current or anticipated weather conditions.

7. The method of claim 1, wherein releasing the cord includes disengaging a motor connected to the winch from the winch, allowing the winch to freely spin and release the cord.

8. The method of claim 1, wherein the retracting force is lower than a maximum AV lift force less a weight of the AV.

9. A non-transitory computer readable medium having stored thereon instructions for causing a processing circuitry to perform the method of claim 1.

10. An aerial cord release mechanism for an aerial vehicle (AV), comprising:
    a processing circuitry;
    a cord coiled around a winch;
    a motor connected to the winch; and
    a memory, the memory containing instructions that, when executed by the processing circuitry, configure the aerial cord release mechanism to:
    determine a retracting force to be applied to a winch of an aerial vehicle (AV), wherein the determined retracting force is a force required to retract a cord to be coiled around the winch within the AV, and wherein the cord is temporarily coupled to the winch, such that an external force exceeding a predetermined threshold causes decoupling between the cord and the winch; and
    determine a slow-release force to be applied to the winch of, wherein the determined slow-release force is a force required to lower a package from the AV by the cord coiled around the winch; and wherein the slow-release force is determined based on a predetermined speed and torque of the winch.

11. The mechanism of claim 10, wherein the predetermined threshold is a force greater than the retracting force.

12. The mechanism of claim 10, wherein the predetermined threshold is a force greater than the slow-release force.

13. The mechanism of claim 10, wherein the slow-release force is determined based on a predetermined amount of time required for a length of cord to be released that is sufficient to ensure the package touches a delivery surface.

14. The mechanism of claim 10, wherein the slow-release force is based on delivery data.

15. The mechanism of claim 14, wherein the delivery data includes at least one of: a navigation plan for the AV, a delivery location, a hover height during AV flight and package delivery, a cord weight, a cord length, a hook weight, a package weight, and current or anticipated weather conditions.

16. The mechanism of claim 10, wherein releasing the cord includes disengaging a motor of the winch from the winch, allowing the winch to freely spin and release the cord.

17. The mechanism of claim 10, wherein the retracting force is lower than a maximum AV lift force less a weight of the AV.

* * * * *